(12) United States Patent
Kuo et al.

(10) Patent No.: US 9,034,968 B2
(45) Date of Patent: May 19, 2015

(54) CATIONIC POLYMERS FOR TREATING CONSTRUCTION AGGREGATES

(75) Inventors: Lawrence L. Kuo, Acton, MA (US); Ying Chen, Arlington, MA (US); Hideo Koyata, Atsugi (JP)

(73) Assignee: W. R. Grace & Co.-Conn., Columbia, MD (US)

( * ) Notice: Subject to any disclaimer, the term of this patent is extended or adjusted under 35 U.S.C. 154(b) by 580 days.

(21) Appl. No.: 13/076,944

(22) Filed: Mar. 31, 2011

(65) Prior Publication Data

US 2012/0252953 A1  Oct. 4, 2012

(51) Int. Cl.
| | | |
|---|---|---|
| *C08K 3/34* | (2006.01) | |
| *C04B 24/26* | (2006.01) | |
| *C04B 28/02* | (2006.01) | |
| *C04B 40/00* | (2006.01) | |

(52) U.S. Cl.
CPC ............ *C08K 3/346* (2013.01); *C04B 24/2652* (2013.01); *C04B 28/02* (2013.01); *C04B 40/0039* (2013.01); *C04B 24/2647* (2013.01)

(58) Field of Classification Search
USPC ........................................................ 524/445
See application file for complete search history.

(56) References Cited

U.S. PATENT DOCUMENTS

| | | | |
|---|---|---|---|
| 4,393,939 A * | 7/1983 | Smith et al. ................... | 166/293 |
| 4,471,100 A | 9/1984 | Tsubakimoto et al. | |
| 4,741,835 A | 5/1988 | Jacques et al. | |
| 4,835,234 A | 5/1989 | Valint et al. | |
| 5,362,827 A | 11/1994 | Bock et al. | |
| 5,393,343 A * | 2/1995 | Darwin et al. ................ | 106/808 |
| 5,661,206 A | 8/1997 | Tanaka et al. | |
| 6,352,952 B1 | 3/2002 | Jardine et al. | |
| 6,482,776 B1 * | 11/2002 | Matz et al. .................... | 507/120 |
| 6,503,977 B1 | 1/2003 | Branham et al. | |
| 6,569,234 B2 | 5/2003 | Yamashita et al. | |
| 6,670,415 B2 | 12/2003 | Jardine et al. | |
| 6,994,846 B2 | 2/2006 | L'Alloret | |
| 7,723,453 B2 | 5/2010 | Carnali et al. | |
| 2002/0008225 A1 * | 1/2002 | Smith ............................ | 252/73 |
| 2002/0121229 A1 | 9/2002 | Jardine et al. | |
| 2003/0136307 A1 | 7/2003 | Ou et al. | |
| 2007/0287794 A1 | 12/2007 | Alain et al. | |
| 2008/0060556 A1 | 3/2008 | Jacquet et al. | |

FOREIGN PATENT DOCUMENTS

| | | |
|---|---|---|
| EP | 2055387 A1 | 5/2009 |
| WO | 9858887 A1 | 12/1998 |
| WO | 0105851 A1 | 1/2001 |
| WO | 2010133886 A1 | 11/2010 |

OTHER PUBLICATIONS

Young, Form PCT/ISA/210, International Search Report for International Application No. PCT/US2012/028410, Jun. 22, 2012, 2 pages.
Young, Form PCT/ISA/237, Written Opinion of the International Searching Authority for International Application No. PCT/US2012/028410, Jun. 22, 2012, 5 pages.
Gattinger, Supplementary European Search Report, Application No. EP12764535, dated Sep. 11, 2014, 4 pages.

* cited by examiner

*Primary Examiner* — Wenwen Cai
(74) *Attorney, Agent, or Firm* — Craig K. Leon

(57) ABSTRACT

The present invention provides methods, admixture compositions for treating clay-bearing aggregates used for construction purposes, and aggregate compositions for construction purposes. The clay-bearing aggregates are treated with a cationic copolymer made from two and preferably three different monomer components. Cementitious compositions containing the treated aggregates are also described.

15 Claims, No Drawings

CATIONIC POLYMERS FOR TREATING CONSTRUCTION AGGREGATES

FIELD OF THE INVENTION

This invention relates to the treatment of sand aggregates used for making construction materials, and more particularly to the mitigation of clay in construction aggregates using a cationic polymer.

BACKGROUND OF THE INVENTION

It is known that sand aggregates used in making construction materials such as concrete can contain clay materials that are detrimental to the concrete and/or to the efficiency of plasticizers used in the concrete.

For example, U.S. Pat. Nos. 6,352,952 and 6,670,415, owned by the common assignee hereof, Jardine et al. disclosed that certain clays, which expanded when in contact with water, were responsible for adversely affecting the dosage efficiency of "EO/PO" type superplasticizers (e.g., which contained ethylene oxide and propylene oxide groups). Jardine et al. taught that clay-activity-modifying agents, such as organic cations (such as quaternary amines which have a strong affinity for cationic exchange with clay), could be introduced to the clay before, during, or after water is introduced to the clay.

As another example, in U.S. Ser. No. 11/575,612 (Publ. No. 2007/0287794 A1) and U.S. Ser. No. 1111/575,607 (Publ. No. 2008/0060556 A1), Jacquet et al. disclosed compositions and methods for inerting clays in sand aggregates intended for use in preparing concrete. The compositions could include monomers already containing a cationic quaternary amine functional group: such as diallyldialkyl ammonium, quaternized (meth)acrylates of dialkylaminoalkyl and (meth)acrylamides N-substituted by a quaternized dialkylaminoalkyl. Particularly preferred were cationic polymers obtained by polycondensation of dimethylamine and epichlorohydrin.

SUMMARY OF THE INVENTION

The present invention relates to the treatment of clay-bearing aggregates which are used in the preparation of concrete, mortar, and asphalt, and particularly to the use of a copolymer obtained through polymerization of certain monomer components, as will be more particularly described hereinafter.

The use of the copolymer can lead to improvement of properties in the cementitious compositions, such as workability without increasing water demand, and to reducing the effort needed to wash and dispose of the clay.

An exemplary method of the present invention for treating clay-bearing aggregates used in construction materials, comprises: introducing to clay-bearing sand aggregates, in an amount of 3% to 60% based on dry weight of said clay, a hydrophobically modified cationic copolymer obtained from the following monomer components:

(A) in an amount of 60-98 mol percent, a cationic polymer selected from quaternized vinyl pyridine or other cationic monomer represented by the following structures

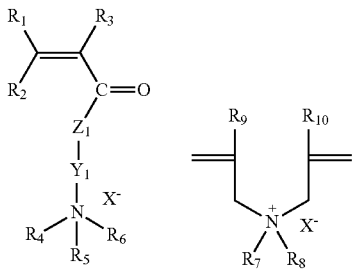

wherein $R_1$, $R_2$, and $R_3$ each independently represent hydrogen, —$CH_3$, or —COOH;

$R_4$, $R_5$, $R_6$, $R_7$, and $R_8$ each independently represent a $C_1$-$C_4$ alkyl group;

$R_9$ and $R_{10}$ each independently represent hydrogen or —$CH_3$;

$Z_1$ represents —O— or —NH—;

$Y_1$ represents —$CH_2CH(OH)CH_2$— or $C_1$-$C_6$ alkyl group; and

X represents a halide, pseudohalide, or sulfate;

(B) in an amount of 2-40 mol percent, a hydrophobic, essentially water-insoluble monomer selected from the group consisting of vinyl acetate, acrylonitrile, methacrylonitrile, styrene and its derivatives, vinyl ethers of formula $CH_2$=CH—O—$R_{11}$ in which $R_{11}$ is a linear or branched, saturated or unsaturated hydrocarbon radical from 1 to 12 carbons, esters or amides of formula $H_2C$=$CR_{12}$—CO—$Z_2$—$R_{13}$ in which $R_{12}$ is hydrogen or $C_1$ to $C_3$ alkyl, $Z_2$ is —O— or —NH—, and $R_{13}$ is a linear or branched, saturated or unsaturated hydrocarbon radicals having from 1 to 18 carbons; and (C) in an amount of 0-20 mol percent, a water-soluble monomer selected from the group consisting of acrylamide, methacrylamide, alkyl or dialkyl acrylamide of methacrylamide, polyalkyleneoxide acrylate, polyalkyleneoxide methacrylate, and polyalkyleneoxide ether.

The present invention also provides an aggregate composition made from the foregoing method. The aggregate composition can be combined with a cement binder to form a mortar or concrete, or combined with asphaltic composition to provide asphalt compositions, and can be used generally to form construction material compositions. The aggregate composition can alternatively be combined with one or more conventional admixture chemicals, such as a water reducer (e.g., superplasticizer) admixture; and may contain both a cement binder and water reducer.

The present invention also provides admixture compositions containing the above-described copolymer for treating construction material compositions in combination with at least one chemical admixture conventionally used for modifying hydratable mortar or concrete, such as one or more water reducing admixtures (e.g., a polycarboxylate comb polymer superplasticizer), or other conventional admixture or admixtures, as will be further described in detail hereinafter.

Exemplary admixture compositions of the invention may be introduced to clay-bearing aggregates at or after the quarry or processing at an aggregates mine, or before or at the concrete mix plant, where the aggregates are combined with cement to provide mortar or concrete compositions.

Further exemplary embodiments of the invention comprise the above-described hydrophobically modified cationic copolymer obtained from monomer components (a) through (c) in combination with cement and aggregate (e.g., concrete).

Further advantages and features of the invention will be described in further detail hereinafter.

DETAILED DESCRIPTION OF EXEMPLARY EMBODIMENTS

The present invention pertains to method and compositions for treating clays in sand aggregates intended for construction material purposes using a hydrophobically-modified cationic polymer, as well as to cement and cementitious compositions, aggregate compositions, and concrete compositions containing the hydrophobically-modified cationic polymer.

The clays may be swelling clays of the 2:1 type (such as smectite type clays) or also of type 1:1 (such as kaolinite) or of the 2:1:1 type (such as chlorite). The term "clays" has referred to aluminum and/or magnesium silicates, including phyllosilicates having a lamellar structure, but this term may also refer to clays not having such structures, such as amorphous clays. The present invention is not limited to swelling clays, which have been seen to absorb EO/PO superplasticizers as previously mentioned in the background, but also includes the use of clays that may directly affect the properties of construction materials whether in their wet or hardened state. Clays which are commonly found in sands include, for example, montmorillonite, illite, kaolinite, muscovite, and chlorite. These are also included in the methods and compositions of the invention.

The clay-bearing sands which are treated by the method of the present invention may be used in cementitious materials, whether hydratable or not, and such cementitious materials include concrete, mortar, and asphalt, which may be used in structural building and construction applications, roadways, foundations, civil engineering applications, as well as in precast and prefabrication applications.

The term "sand" as used herein shall mean and refer to aggregate particles usually used for construction materials such as concrete, mortar, and asphalt, and this typically involves granular particles of average size between 0 and 8 mm, preferably between 2 and 6 mm. Sand aggregates may comprise calciferous, siliceous or siliceous limestone minerals. Such sands may be natural sand (e.g., derived from glacial, alluvial, or marine deposits which are typically weathered such that the particles have smooth surfaces) or may be of the "manufactured" type made using mechanical crushers or grinding devices.

The construction materials in which the sand is used include hydratable cementitious compositions, such as mortar and concrete, and also may involve asphalt compositions.

The term "cement" as used herein includes hydratable cement and Portland cement which is produced by pulverizing clinker consisting of hydraulic calcium silicates and one or more forms of calcium sulfate (e.g., gypsum) as an interground additive. Typically, Portland cement is combined with one or more supplemental cementitious materials, such as Portland cement, fly ash, granulated blast furnace slag, limestone, natural pozzolans, or mixtures thereof, and provided as a blend. The term "cementitious" refers to materials that comprise Portland cement or which otherwise function as a binder to hold together fine aggregates (e.g., sand), coarse aggregates (e.g., crushed gravel), or mixtures thereof.

The term "hydratable" is intended to refer to cement or cementitious materials that are hardened by chemical interaction with water. Portland cement clinker is a partially fused mass primarily composed of hydratable calcium silicates. The calcium silicates are essentially a mixture of tricalcium silicate ($3CaO \cdot SiO_2$ "$C_3S$" in cement chemists notation) and dicalcium silicate ($2CaO \cdot SiO_2$, "$C_2S$") in which the former is the dominant form, with lesser amounts of tricalcium aluminate ($3CaO \cdot Al_2O_3$, "$C_3A$") and tetracalcium aluminoferrite ($4CaO \cdot Al_2O_3 \cdot Fe_2O_3$, "$C_4AF$"). See e.g., Dodson, Vance H., *Concrete Admixtures* (Van Nostrand Reinhold, New York N.Y. 1990), page 1.

The term "concrete" will be used herein generally to refer to a hydratable cementitious mixture comprising water, cement, sand, usually a coarse aggregate such as crushed gravel, and optional chemical admixture(s).

As used herein, the term "copolymer" or "polymer" as used herein refers to compounds containing at least two different monomer components (designated as "A" and "B") and optionally at least three different monomer components (further including optional monomer designated as "C").

The copolymers of the invention are preferably made by conventional addition polymerization techniques such as radical polymerization. Preferably, the polymerization is conducted in aqueous solution using a water soluble free radical initiator including peroxides, such as hydrogen peroxide; persulfates, such as ammonium, sodium, or potassium persulfate; and water soluble azo initiators. Preferably, the molecular weight range of the copolymer is 1000-100,000; more preferably 2,000-60,000; and most preferably the molecular weight range is 5,000-50,000.

As summarized above, exemplary methods of the present invention involve introducing the copolymer to clay-bearing aggregates at a quarry or mining plant, where the aggregate is manufactured or washed, or the copolymer can be introduced to the clay-bearing aggregates at a concrete mixing plant, where cement and aggregates are combined to make a hydratable mortar or concrete. In further exemplary methods, the copolymer can also be added directly into the mortar or concrete, separately or together or in mixture with one or more conventional admixtures. Such conventional admixtures may include for example, lignin sulfonate, naphthalene sulfonate formaldehyde condensate (NSFC), melamine sulfonate formaldehyde condensate (MSFC), polycarboxylate comb polymers, gluconate, set retarders, set accelerators, defoamers, air entraining agents, surface active agents, or mixtures thereof.

Of the admixtures, so-called EO/PO type polymers, which have ethylene oxide ("EO") and/or propylene oxide ("PO") groups and polycarboxylate groups, are preferred. Cement dispersants contemplated for use in the invention include EO/PO polymers and EO/PO comb polymers, as described for example in U.S. Pat. Nos. 6,352,952 B1 and 6,670,415 B2 of Jardine et al., which mentioned the polymers taught in U.S. Pat. No. 5,393,343 assigned to W. R. Grace & Co.—Conn. These polymers are available from Grace under the trade name "ADVA®". Another exemplary cement dispersant polymer, also containing EO/PO groups, is obtained by polymerization of maleic anhydride and an ethylenically-polymerizable polyalkylene, as taught in U.S. Pat. No. 4,471,100. In addition, EO/PO-group-containing cement dispersant polymers are taught in U.S. Pat. No. 6,569,234 B2 and U.S. Pat. No. 5,661,206. The amount of such polycarboxylate cement dispersants used within concrete may be in accordance with conventional use (e.g., 0.05% to 0.25% based on weight of active polymer to weight of cementitious material).

Thus, exemplary admixture compositions of the invention comprise: the above-described copolymer and at least one polycarboxylate cement dispersant, which is preferably a polycarboxylate comb polymer having EO and PO groups, as described above.

As summarized above, an exemplary method of the present invention comprises: introducing to clay-bearing sand aggregates, in an amount of 3% to 60% based on weight of clay treated, at least one copolymer obtained from monomer components (A), (B), and optionally (C), as follows:

(A) in an amount of 60-98 mol percent, a cationic polymer selected from quaternized vinyl pyridine or other cationic monomer represented by the following structures

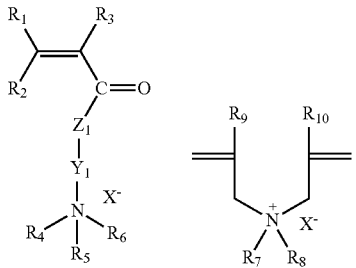

wherein $R_1$, $R_2$, and $R_3$ each independently represent hydrogen, —$CH_3$, or —COOH;

$R_4$, $R_5$, $R_6$, $R_7$, and $R_8$ each independently represent a $C_1$-$C_4$ alkyl group;

$R_9$ and $R_{10}$ each independently represent hydrogen or —$CH_3$;

$Z_1$ represents —O— or —NH—;

$Y_1$ represents —$CH_2CH(OH)CH_2$— or $C_1$-$C_6$ alkyl group; and

X represents a halide, pseudohalide, or sulfate;

(B) in an amount of 2-40 mol percent, a hydrophobic, essentially water-insoluble monomer selected from the group consisting of vinyl acetate, acrylonitrile, methacrylonitrile, styrene and its derivatives, vinyl ethers of formula $CH_2$=CH—O—$R_{11}$ in which $R_{11}$ is a linear or branched, saturated or unsaturated hydrocarbon radical from 1 to 12 carbons, esters or amides of formula $H_2C$=$CR_{12}$—CO—$Z_2$—$R_{13}$ in which $R_{12}$ is hydrogen or $C_1$ to $C_3$ alkyl, $Z_2$ is —O— or —NH—, and $R_{13}$ is a linear or branched, saturated or unsaturated hydrocarbon radicals having from 1 to 18 carbons; and (C) in an amount of 0-20 mol percent, a water-soluble monomer selected from the group consisting of acrylamide, methacrylamide, alkyl or dialkyl acrylamide of methacrylamide, polyalkyleneoxide acrylate, polyalkyleneoxide methacrylate, and polyalkyleneoxide ether.

Monomer component (A) can be chosen, for example, from a list including diallyl dimethyl ammonium chloride (DADMAC), 2-acryloyloxyethyl trimethyl ammonium chloride (AETAC), 2-methacryloyloxyethyl trimethyl ammonium chloride (METAC), acrylamidopropyl trimethyl ammonium chloride (APTMAC), methacrylamidopropyl trimethyl ammonium chloride (MPTMAC), quaternized N-vinylpyridine, quaternized 2-vinylpyridine, quaternized 4-vinylpyridine.

As mentioned above regarding the first monomer component, "X" can represent a halide, pseudohalide, or a sulfate. Preferred halides are chloride and bromide. A pseudohalide is an anion that shares common structural and electronic features with the halides. Examples include cyanide, thiocyanate, azidothiocarbonate, selenocyanate, tellurocyanate, cyanate, azide, and their structural isomers.

Monomer component (B) can be chosen, for example, from acrylonitrile, methacrylonitrile, vinyl acetate, vinyl propionate, vinyl pivalate, vinyl butyrate, vinyl methacrylate, vinyl laurate, vinyl decanoate, styrene, α-methylstyrene, 3-methylstyrene, 4-methylstyrene, 4-tert-butylstyrene, 2,4-dimethylstyrene, 2,4,6-trimethylstyrene, vinyl ethyl ether, vinyl propyl ether, vinyl butyl ether, vinyl isooctyl ether, vinyl 2-ethylhexyl ether, vinyl dodecyl ether, methyl (meth)acrylate, ethyl (meth)acrylate, butyl (meth)acrylate, hexyl (meth)acrylate, 2-ethylhexyl (meth)acrylate, octyl (meth)acrylate, isodecyl (meth)acrylate, decyl (meth)acrylate, lauryl (meth)acrylate, dodecyl (meth)acrylate, tetradecyl (meth)acrylate, hexadecyl (meth)acrylate, octadecyl (meth)acrylate, N-dodecyl (meth)acrylamide, N-tert-octyl (meth)acrylamide, and N-1-hexyl (meth)acrylamide.

Monomer component (C) can be chosen, for example, from a group including acrylamide, methacrylamide, N-methyl acrylamide, N-methyl methacrylamide, N-methylol acrylamide, N-methylol methacrylamide, N-isopropyl acrylamide, N,N-dimethyl acrylamide, N,N-dimethyl methacrylamide, N-vinyl pyrrolidone, 2-vinyl pyridine, 4-vinyl pyridine, N-vinyl pyridine, polyalkyleneoxide acrylate, polyalkyleneoxide methacrylate, and polyalkyleneoxide ether.

In preferred embodiments of the invention, the molar ratio (A:B) of monomer component (A) to monomer component (B) is 0.60:0.40 to 0.98:0.02; and, more preferably, the molar ratio (A:B) is 0.75:0.25 to 0.95:0.05.

In other preferred embodiments, $R_7$ and $R_8$ of the above-described copolymer are —$CH_3$; and $R_9$ and $R_{10}$ of said copolymer are hydrogen.

In other preferred embodiments, $Z_1$ is oxygen and $Y_1$ is —$CH_2CH_2$—.

In still further embodiments, $Z_1$ is —NH— and $Y_1$ is —$CH_2CH_2CH_2$—.

In other embodiments of the invention, the above-described copolymer may contain two or more monomer components which are both represented by the structure of the first monomer (A). In other embodiments of the invention, the copolymer may contain two or more monomer components which are both represented by the structure of the second monomer (B).

In preferred embodiments of the invention, the copolymer has a Brookfield viscosity of 5 to 500 Centipoise (hereinafter "cps") at 30 wt % aqueous solution at 20 degrees C.; and, more preferably, the copolymer has a Brookfield viscosity of 10 to 200 cps at 30 wt % aqueous solution at 20 degrees C.

Preferably, in methods and compositions of the invention, the amount of the copolymer introduced to the clay is 5% to 40%, and more preferably 8% to 20% by weight, based on the weight of the clay being treated.

In one exemplary method of the invention, the sand treated by the copolymer may then be combined with the components for making concrete, mortar, or asphalt. The present invention also relates to concrete, mortar, or asphalt containing the sand, clay, and above-described copolymer. The copolymer may be introduced to the sand by application to the clay-containing aggregates at the quarry or mine, or at the concrete mix plant where the aggregates are combined with cement to form hydratable mortar or concrete. The copolymer may be incorporated into the aggregates at the concrete mix plant before the cement binder is added, or into dry or wet mortar or concrete.

Thus, the invention also provides chemical admixtures containing the copolymer described above as well as to aggregate compositions, cementitious compositions, and concrete compositions containing the hydrophobicaly modified cationic copolymer. It is contemplated that conventional chemical admixtures may be used in combination with the above-described copolymer in exemplary methods, admixture compositions, cementitious compositions, aggregate compositions, and concrete compositions of the invention. Such conventional admixtures may include for example, lignin sulfonate, naphthalene sulfonate formaldehyde condensate (NSFC), melamine sulfonate formaldehyde condensate (MSFC), polycarboxylate polymer cement dispersants (such as the ethylene oxide/propylene oxide (EO/PO) type described above), gluconate, set retarders, set accelerators, defoamers, air entraining agents, surface active agents, or mixtures thereof.

Hence, the present invention also provides chemical admixture compositions comprising the above-mentioned copolymer in combination with at least one conventional admixture, such as water reducing admixtures (e.g., superplasticizers), defoamers, air entraining agents, surfactants, or mixtures thereof.

Exemplary cement and cementitious compositions, aggregate compositions, and concrete compositions of the invention contain the hydrophobically-modified cationic polymer derived from the aforementioned monomer components (A), (B), and optionally (C). Thus, exemplary cementitious compositions of the invention comprise at least one hydratable cement binder in combination with the above-described copolymer for treating clay, and optionally aggregates containing clay which requires the treatment described herein. Exemplary aggregate compositions of the invention comprise sand aggregate in combination with the above-described hydrophobically-modified cationic polymer. The sand aggregate may contain clay which requires treatment by the above-described hydrophobically-modified cationic polymer, or it may be added to sand aggregate that contains the clay which requires said treatment. Exemplary concrete compositions of the invention comprise aggregate containing the clay which requires the treatment, cement, and the above-described hydrophobically-modified cationic polymer While the invention is described herein using a limited number of embodiments, these specific embodiments are not intended to limit the scope of the invention as otherwise described and claimed herein. Modification and variations from the described embodiments exist. More specifically, the following examples are given as a specific illustration of embodiments of the claimed invention. It should be understood that the invention is not limited to the specific details set forth in the examples. All parts and percentages in the examples, as well as in the remainder of the specification, are by percentage weight unless otherwise specified.

EXAMPLE 1

A diallyl dimethyl ammonium chloride (DADMAC) monomer aqueous solution (78.8 g, 65% active), n-propanol (40 ml), and distilled water (50 ml) were transferred into a 500 ml flask equipped with a condenser, a mechanical stirrer, a thermocouple and a nitrogen inlet. The system was purged with nitrogen gas to remove air, and the solution temperature was increased to 70 degrees C. Into the flask, three solutions, 55 g of DADMAC monomer aqueous solution (65% active), a solution of 1 ml of 3-mercaptopropionic acid, 11 g of 2-ethylhexyl acrylate (2-EHA, 11 g) in 49 ml n-propanol, and 40 ml aqueous solution of ammonium persulfate (9.12 g) were added into the flask simultaneously over a period of 8 hours. After addition, the reaction was held at 70° C. for 12 hours, then stopped by cooling to ambient temperature. The resulting material is called Polymer A.

Using the same procedure, the following polymers were synthesized and summarized in Table 1.

TABLE 1

Cationic polymers synthesized via procedure described in Example 1

| | DADMAC | Hydrophobic monomer | | Brookfield |
|---|---|---|---|---|
| | (wt %) | Type [a] | wt % | Viscosity [b] |
| Polymer A | 78 | 2-EHA | 22 | 48 |
| Polymer B | 89 | 2-EHA | 11 | 21 |
| Polymer C | 74 | t-BA | 26 | 104 |
| Polymer D | 84 | t-BA | 16 | 65 |
| Polymer E | 92 | t-BA | 8 | 31 |
| Polymer F | 95 | BMA | 5 | NA |
| Polymer G | 95 | MMA | 5 | NA |
| Reference-1 | 100 | none | 0 | 36 |

[a] 2-EHA: 2-ethylhexyl acrylate; t-BA: tert-butyl acrylate; BMA, n-butyl methacrylate; MMA: methyl methacrylate.
[b] Brookfield viscosity was measured at 30 wt % solution, 20° C. using spindle S61 on model DV-II+ Brookfield viscometer.

EXAMPLE 2

Another exemplary polymer (Polymer H) was synthesized as follows. Degassed water (50 ml) and n-propanol (50 ml) were charged into a 500 ml flask equipped with a condenser, a mechanical stirrer, a thermocouple and a nitrogen inlet. The system was then purged with nitrogen gas and heated to 70° C. Into the flask, three solutions, 112.5 g of 2-(methacryloyloxy)ethyl trimethylammonium chloride (METAC) monomer aqueous solution (80 wt % active), a solution of 1 ml of 3-mercaptopropionic acid, 10 g of t-butyl acrylate (t-BA) in 50 ml n-propanol, and 40 ml aqueous solution of ammonium persulfate (7.77 g) were added into the flask simultaneously over a period of 8 hours. After addition, the reaction was hold at 70° C. for 12 hours then stopped by cooling to ambient temperature. The resulting material is called Polymer H.

Using the above descried procedure, the following polymers were synthesized and summarized in Table 2.

TABLE 2

Cationic copolymer synthesized via procedure described in Example 2.

| | METAC (wt %) | t-BA (wt %) | Brookfield Viscosity [a] |
|---|---|---|---|
| Polymer H | 90 | 10 | 26 |
| Polymer I | 95 | 5 | 22 |
| Reference-2 | 100 | 0 | 15 |

[a] Brookfield viscosity was measured at 30 wt % solution, 20° C. using spindle S61 on model DV-II+ Brookfield viscometer.

EXAMPLE 3

The effects of Polymers A, B, C, D and E on mortar workability were tested against the Reference-1, which is a homopolymer of DADMAC synthesized using the same procedure. The mortar test results are illustrated in Table 2. Mortar was prepared in the traditional manner and was formulated as follows for 10 wt % treatment dosage: sand (1350 g), cement (650 g), sodium montmorillonite (2.7 g), water (240 g), 1.95 g of 40 wt % aqueous polycarboxylate superplasticizer (0.12% active by weight of cement), and 2.7 g of 10 wt % aqueous polymer solution of this invention. The aqueous polymer solution of this invention was added to a pre-blended mixture of sodium montmorillonite and sand, followed by addition of cement water and polycarboxylate superplastisizer. The workability of mortar was determined by measuring the slump and flow and was calculated by the following equation, workability=slump+(flow 1+flow 2)/2−100.

TABLE 3

Mortar workability test

| | wt % on sodium montmorillonite | w/c ratio | Workability (mm) |
|---|---|---|---|
| Polymer A | 10 | 0.37 | 215 |
| Polymer B | 10 | 0.37 | 181 |
| Polymer C | 10 | 0.37 | 178 |
| Polymer D | 10 | 0.37 | 190 |
| Polymer E | 10 | 0.37 | 198 |
| Reference-1 | 10 | 0.37 | 178 |
| Polymer A | 25 | 0.36 | 208 |
| Polymer B | 25 | 0.36 | 227 |
| Polymer C | 25 | 0.36 | 209 |
| Polymer D | 25 | 0.36 | 241 |
| Polymer E | 25 | 0.36 | 231 |
| Reference-1 | 25 | 0.36 | 190 |

As shown in Table 3, at equal w/c ratio and polymer dosage, the hydrophobically modified Polymers A, B, C, D and E exhibited higher workability as compared to the unmodified polymer (Reference-1), indicating the effectiveness of these materials as clay mitigating agents.

EXAMPLE 4

The performance of the Polymers F and G were evaluated by mortar test. The test procedure of Example 3 was employed except that the workability was measured as a function of time. The mortar workability performance results of mortars containing the polymers are summarized below in Table 4.

TABLE 4

Mortar workability test

|  | Wt % on sodium montmorillonite | Workability (mm) | | |
| --- | --- | --- | --- | --- |
|  |  | 4 min. | 30 min. | 60 min. |
| Polymer F | 6% | 203 | 158 | 85 |
| Polymer G | 6% | 215 | 153 | 81 |
| Reference-1 | 6% | 206 | 138 | 60 |
| Reference | 0 | 140 | 30 | 20 |

The results in Table 4 indicate that the polymer of this invention clearly enhanced workability retention of the mortar.

EXAMPLE 5

The performance of the Polymer I was evaluated by mortar test against Reference-2 following the test protocol described in Example 3 except that the polymer of this invention was used at 15 weight percent based on the weight of sodium montmorillonite. The results of mortar workability performance is shown below in Table 5.

TABLE 5

Mortar Workability Test

|  | Workability (mm) | | |
| --- | --- | --- | --- |
|  | 9 min. | 30 min. | 60 min. |
| Polymer I | 290 | 223 | 165 |
| Reference-2 | 257 | 199 | 135 |

As shown in Table 5, incorporation of hydrophobic monomers was seen to enhance workability of the mortar.

EXAMPLE 6

The effects of the Polymers B and D on concrete slump were tested against Reference-1, which is a homopolymer of DADMAC.

Concrete was prepared in the traditional manner as follows: sand (1374 lb/yd3), stone (1800 lb/yd3), cement X (Ordinary Portland Cement, 658 lb/yd3), water (42 wt % based on cement), sodium montmorillonite (2.75 lb/yd3), polycarboxylate superplasticizer (0.135% active by weight of cement), and the polymers of this invention were added at 30 wt % active based on the weight of sodium montmorillonite. Sand was blended with sodium montmorillonite and then mixed with the cationic polymer prior to mixing into the concrete. The performance of the sand containing the polymers is shown below in Table 6.

TABLE 6

Concrete slump test

|  | Concrete slump (inch) at | | |
| --- | --- | --- | --- |
|  | 9 min | 30 min | 50 min |
| Polymer B | 24.50 | 19.25 | 16.25 |
| Polymer D | 24.75 | 19.25 | 16.75 |
| Reference-1 | 21.75 | 18.00 | NA |

As shown in Table 6, both Polymer B and D outperformed Reference-1 in providing higher initial slump and higher slump over time.

EXAMPLE 7

The effects of the Polymers B and D on concrete slump and slump retention were also evaluated against Reference-1 using a different cement. The test protocol of Example 6 was employed except that cement X was replaced with cement Y, also an OPC.

TABLE 7

Concrete slump test

| Entry | Concrete slump (inch) at | | |
| --- | --- | --- | --- |
|  | 9 min | 30 min | 50 min |
| Polymer B | 25.25 | 22.25 | 19.25 |
| Polymer D | 26.00 | 21.25 | 16.75 |
| Reference-1 | 21.00 | 19.50 | 16.75 |

The higher slumps for both Polymer B and D shown in Table 7 confirm that the polymers of this invention performed as effective clay mitigating agents.

EXAMPLE 8

The effects of the Polymer H on concrete slump were tested against Reference-2, which is a homopolymer of METAC, using the test protocol of Example 6 and OPC cement Z. The concrete slump test results are tabulated in Table 8.

TABLE 8

Concrete slump test

|  | Concrete slump (inch) at | | |
| --- | --- | --- | --- |
|  | 9 min | 30 min | 50 min |
| Polymer H | 24.25 | 19.25 | 18.00 |
| Reference-2 | 24.75 | 17.75 | 16.50 |

As shown in Table 8, although the initial slumps of Polymer H and Reference-2 are comparable, Polymer G is capable of maintaining a higher slump than Reference-2 over time, indicating its effectiveness as a clay mitigating polymer.

The foregoing examples and embodiments were presented for illustrative purposes only and not intended to limit the scope of the invention.

It is claimed:
1. A method for treating clay-bearing sand aggregates used in construction materials, comprising:
introducing to clay-bearing sand aggregates, in an amount of 3% to 60% based on weight of clay treated, at least one copolymer obtained by copolymerizing monomer components (A), (B), and (C), as follows:

(A) in an amount of 60-98 mol percent, a cationic monomer selected from quaternized vinyl pyridine and other cationic monomer represented by the following structures

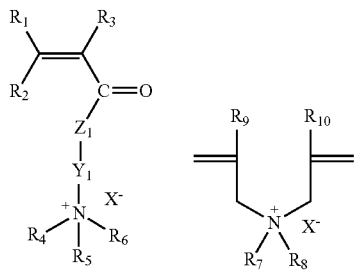

wherein
$R_1$, $R_2$, and $R_3$ each independently represent hydrogen, —$CH_3$, or —COOH;
$R_4$, $R_5$, $R_6$, $R_7$, and $R_8$ each independently represent a $C_1$-$C_4$ alkyl group;
$R_9$ and $R_{10}$ each independently represent hydrogen or —$CH_3$;
$Z_1$ represents —O— or —NH—;
$Y_1$ represents —$CH_2CH(OH)CH_2$— or $C_1$-$C_6$ alkyl group; and
X represents a halide, pseudohalide, or sulfate;

(B) in an amount of 2-40 mol percent, a hydrophobic, essentially water-insoluble monomer selected from the group consisting of vinyl acetate, styrene and its derivatives, vinyl ethers of formula $CH_2$=CH—O—$R_{11}$ in which $R_{11}$ is a linear or branched, saturated or unsaturated hydrocarbon radical from 1 to 12 carbons, and esters of formula $H_2C$=$CR_{12}$—CO—$Z_2$—$R_{13}$ in which $R_{12}$ is hydrogen or $C_1$ to $C_3$ alkyl, $Z_2$ is —O—, and $R_{13}$ is a linear or branched, saturated or unsaturated hydrocarbon radicals having from 1 to 18 carbons; and (C) in an amount of greater than 1 and no greater than 20 mol percent, a water-soluble monomer selected from the group consisting of acrylamide, methacrylamide, alkyl acrylamide, dialkyl acrylamide, alkyl methacrylamide, dialkyl methacrylamide, polyalkyleneoxide acrylate, polyalkyleneoxide methacrylate, and polyalkyleneoxide ether.

2. The method of claim 1 wherein said copolymer has a molecular weight of 1,000-100,000.

3. The method of claim 2, wherein said copolymer has a molecular weight of 2,000-60,000.

4. The method of claim 3, wherein said copolymer has a molecular weight of 5,000-50,000.

5. The method of claim 1 wherein the molar ratio (A:B) of said first monomer component (A) to said second monomer component (B) is 0.80:0.20 to 0.98:0.02.

6. The method of claim 1 wherein each of $R_7$ and $R_3$ are —$CH_3$ groups, and each of $R_9$ and $R_{10}$ are hydrogen.

7. The method of claim 1 wherein $Y_1$ is —$CH_2CH_2$—.

8. The method of claim 1 wherein said copolymer has two or more monomer components which are represented by said structures of said first monomer component (A).

9. The method of claim 1 wherein said copolymer has two or more monomer components which are represented by said structure of said monomer component (B).

10. The method of claim 1 wherein the amount of said copolymer introduced to said clay is 5% to 40% by weight based on the weight of said clay.

11. The method of claim 1 wherein the amount of said copolymer introduced to said clay is 8% to 20% by weight based on the weight of said clay.

12. The method of claim 1 wherein said copolymer is introduced to said clay separately, followed by addition of a water reducing admixture.

13. The method of claim 1 wherein said copolymer is introduced to said clay together with a water reducing admixture.

14. The method of claim 13 wherein said water reducing admixture is an EO/PO polycarboxylate superplasticizer.

15. The method of claim 1 wherein said copolymer is introduced to said clay together with gluconate and/or an EO/PO polymer.

* * * * *